(12) United States Patent
Tolkin (10) Patent No.: US 6,466,942 B1
(45) Date of Patent: Oct. 15, 2002

(54) USING INDEXES TO RETRIEVE STORED INFORMATION

(75) Inventor: Steven Tolkin, Newton, MA (US)

(73) Assignee: FMR Corp., Boston, MA (US)

( * ) Notice: Subject to any disclaimer, the term of this patent is extended or adjusted under 35 U.S.C. 154(b) by 0 days.

(21) Appl. No.: 09/200,876

(22) Filed: Nov. 30, 1998

(51) Int. Cl.7 ............................................... G06F 17/30
(52) U.S. Cl. ...................... 707/102; 707/100; 707/104; 707/2
(58) Field of Search ............................... 707/100, 102, 707/1, 104, 3

(56) References Cited

U.S. PATENT DOCUMENTS

| | | | |
|---|---|---|---|
| 5,404,510 A | | 4/1995 | Smith et al. |
| 5,418,947 A | | 5/1995 | Hsu et al. |
| 5,729,741 A | * | 3/1998 | Liaguno et al. ............. 707/104 |
| 5,778,354 A | | 7/1998 | Leslie et al. |
| 5,799,308 A | * | 8/1998 | Dixon ........................ 707/100 |
| 5,873,079 A | | 2/1999 | Davis, III et al. |
| 5,918,225 A | | 6/1999 | White et al. |
| 5,995,971 A | * | 11/1999 | Douceur et al. ............ 707/102 |
| 6,029,170 A | * | 2/2000 | Garger et al. ............... 707/100 |

OTHER PUBLICATIONS

Ramakrishnan R., Database Management Systems, 1st. ed., ISBN 007050775–9, 1997, free on–line supporting material: "Storing Data: Disks and Files, Module 2, Lecture 1", "File Organizations and Indexing, Module 2, Lecture 2".
Wiederhold, Gio, "Database Design", McGraw–Hill, 1977, pp. 90–121.
Han, CMPT354 Database Systems and Structures, http://www.cs.sfu.ca/CC/354/han/, Spring 1997 (97–1), Lecture Notes, "Indexing & Hashing", Chapter 11, Mar. 24, 1997, pp. 1–16.
Oracle8™ Indexing Strategies, Jun. 1997, pp. 1–11.
Gerald David Held, "Storage Structures for Relational Data Base Management Systems". Ph.D. Thesis, University of California, Berkeley, Dec. 1975, pp. 1–120.
M. Schkolnick, "Secondary Index Optimization". Department of Computer Science, Carnegie–Mellon University, Pittsburgh, PA, 1975 ACM SIGMOD Conference, King (editor) pp. 3–9.
D. Motzkin, "An Efficient Directory System for Document Retrieval". Western Michigan University, Kalamazoo, MI, 1991, pp. 291–304.
Michael Stonebraker, "Retrieval Efficiency Using Combined Indices" ACM SIGFIDET, Dean (editor) Department of Electrical Engineering and Computer Science, University of California, Berkeley, 1972, pp. 243–254.
DB2 Universal Database and DB2 Connect Online Support, "Technical Library". Http://www–4.ibm.com/cgi–bin/db2www, Aug. 1, 2000, pp. 1–1, and 504–507.
DB2 Universal Database and DB2 Connect Online Support, "Technical Library". Http://www–4.com/cgi–bin/db2www, Aug. 1, 2000, pp. 1–1, and p. 35.
DB2 Universal Database and DB2 Connect Online Support, "Technical Library". Http://www–4.com/cgi–bin/db2www, Aug. 16, 2000, pp. 1–1, and 120–124.

* cited by examiner

Primary Examiner—Diane D. Mizrahi
(74) Attorney, Agent, or Firm—Fish & Richardson P.C.

(57) ABSTRACT

Information is retrieved from computer-stored records. An index of entries is provided that contains values that are keys for respective ones of the stored records, the keys being used to reduce the time required to locate records. Additional information, included in the index of entries, is used for a purpose other than to reduce the time required to locate records. In connection with computer operations associated with the index, the additional information is treated in a manner different from the manner in which the keys are treated.

34 Claims, 4 Drawing Sheets

USING INDEXES TO RETRIEVE STORED INFORMATION

BACKGROUND OF THE INVENTION

This invention relates to using indexes to retrieve stored information.

Information in a relational database 10 (FIG. 1), for example, is stored as records 14a, 14b, . . . in tables 12a, 12b, . . . Each record contains data values for one or more fields 16a, 16b, . . . .

In a database of financial accounts, a table called ACCOUNTS may have a record for each financial account. The fields of the ACCOUNTS table could include an account identifying number (ACCT_ID) and a tax reporting number (TRN). The database may have other tables, and relationships may be defined between fields of different tables.

One simple, but often inefficient way to find a record that pertains to a given ACCT_ID is to search through the table, record by record, for the one that has that ACCT_ID.

Figure 1:
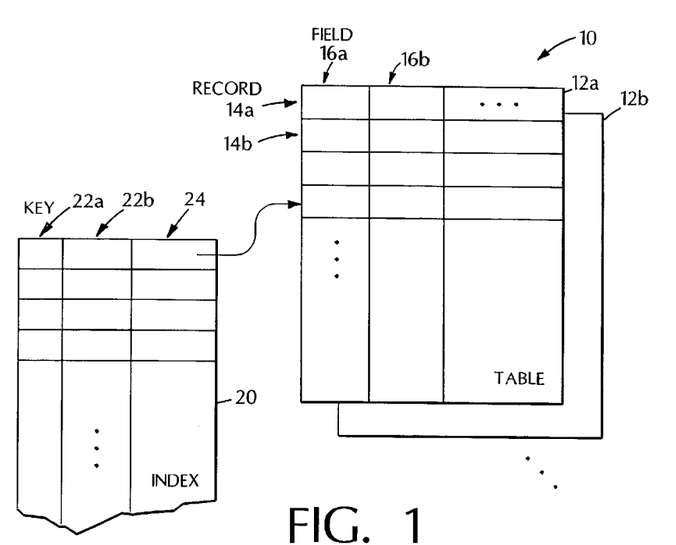
FIGS. 1 through 5 show database tables and indices.

To avoid having to do a full record-by-record search, a database system typically allows a user to define an index 20 for the table. The index has a field 22a that contains values of a "key" field of the table, e.g., field 16a. The entries of the index may be organized in a way that makes it easy to find an index entry that has a certain key value. For example, the index entries may be sorted in the numerical order of the values in the key field.

Each index entry contains a key value and an associated locator 24 that points to the location of the table record that corresponds to the key value of the record. Once a desired field value is found in the index, the table record can be accessed quickly using the locator.

Although an index consumes additional storage space without adding any more information to what is already in the tables of the database, the use of an index for retrieval saves other computer resources because the index is faster to search. On the other hand, additional computer resources are required to deal with the index when new records are inserted or records are deleted in the table and may be required when records are updated. These operations on records may require changing the corresponding entry in one or more indexes.

As an example of an index search, if the index key field 22a corresponds to ACCT_ID numbers in field 16a of the table then a desired TRN in field 16b corresponding to a known ACCT_ID value can be quickly retrieved by searching the index for the entry that has the known ACCT_ID value and then accessing the table record that is identified by the locator found in that index record. Yet even this simple process can use a lot of computer resources if there is a high rate of database queries in which an index is searched for an ACCT_ID and the records are accessed to get the corresponding TRN.

Database systems allow a user to create a special kind of index, called a composite index, in which (in our example) the TRNs from the table appear in a second field of the index, as part of a composite key, together with the corresponding ACCT_ID key field. (Composite keys are also known as concatenated keys, compound keys, and multi-field keys.) This permits a simplified search process, called index-only searching, in which a TRN is retrieved directly from the index without having to access an underlying table record.

If the key value in each entry of an index is unique, it is possible to locate unambiguously a single record associated with a given value of the key. Database systems therefore allow a user to specify that an index have a key that is unique. The database system is capable of enforcing the uniqueness of the key but doing so costs computer resources.

In unique indexes, all fields of the index taken together determine uniqueness. In our example, if there were a unique index on the ACCT_ID and TRN fields, the entire combination would be analyzed in determining uniqueness.

SUMMARY OF THE INVENTION

The computer resources that must be expended to perform an index search of a database table may be reduced by storing, in the index, additional information (extra data) from, e.g., the associated table and refraining from using the extra data when searching. Such an index may be called an augmented index. Although the extra data, e.g., is not used for searching, it can be used to return data for an index-only search. The key and/or the extra data in an augmented index can contain more than one field.

A useful kind of augmented index has a unique key and is called a unique augmented index. In a unique augmented index, the uniqueness constraint is not enforced on the extra data but only on the unique keys portion of the index entry.

The invention is also useful with a conventional composite unique index which is redundant with a "smaller" unique index (i.e., the key fields of the smaller index are a proper subset of the key fields of the larger index). In earlier systems, the uniqueness constraint would be enforced on the composite index. Using the invention, the uniqueness constraint need only be enforced on the "smaller" unique index, which saves computer resources.

Thus, in general, in one aspect, the invention features a method for use in retrieving information from computer-stored records. An index of entries is provided that contains values that are keys for respective the stored records, the keys being used to reduce the time required to locate records. Additional information, included in the index of entries, is used for a purpose other than to reduce the time required to locate records. In connection with computer operations associated with the index, the additional information is treated in a manner different from the manner in which the keys are treated.

Implementations of the invention may include one or more of the following features. The index may be an index to a single table of a database or a join index to at least two tables. The index may be unique or non-unique. The keys may be used for locating records or checking uniqueness. The additional information may be derived from the records of the database (or other stored records) and may be used as data. The additional information may be stored in the index in a compressed form and may be of at least two different types.

In general, in another aspect, the invention features a method of forming an index for use in retrieving information from computer-stored records. As before, the entries contain values that are keys for respective ones of the stored records. At least some of the entries also contain additional information. Data is also stored that identifies the additional information as information that need not be treated as unique during computer operations associated with the index. In implementations of the invention, the data that is also stored may include a bit map pointing to fields that contain additional information or may include a value that indicates a number of fields that contain additional information.

In general, in another aspect the invention features providing a composite unique index of entries that contain values that are keys for respective ones of the stored records, the keys being used to reduce the time required to locate records, the key fields including a proper subset of key fields that are a smaller unique index of the entries. In connection with computer operations associated with the index, the key fields that are not part of the proper subset are treated in a manner different from the manner in which the key fields in the proper subset are treated.

Among the advantages of the invention are one or more of the following.

A unique augmented index has essentially the same size and can be maintained (after an insert, update, or delete) in essentially the same way and at essentially the same cost as a single corresponding conventional unique index. One augmented index can provide the functionality and performance of two (or more) conventional indexes. Thus the augmented index can render some conventional indexes superfluous, making it unnecessary to create or maintain them. Database operations are improved because less main memory is used. Fewer index entries are read during index-only access. Better query optimization is achieved because there are fewer indexes to consider. Database administration is easier because there are fewer indexes to create and manage. A unique augmented index can both enforce uniqueness and provide the improved performance of an index-only access. Less secondary memory (disk space) is used by one augmented index compared with multiple conventional indexes. Most database systems keep a main memory cache of frequently used database blocks to avoid reading them from secondary memory each time they are needed. Eliminating the superfluous index saves space in the cache.

Other advantages and features will become apparent from the following description and from the claims.

DESCRIPTION OF THE PREFERRED EMBODIMENTS

Figure 2:
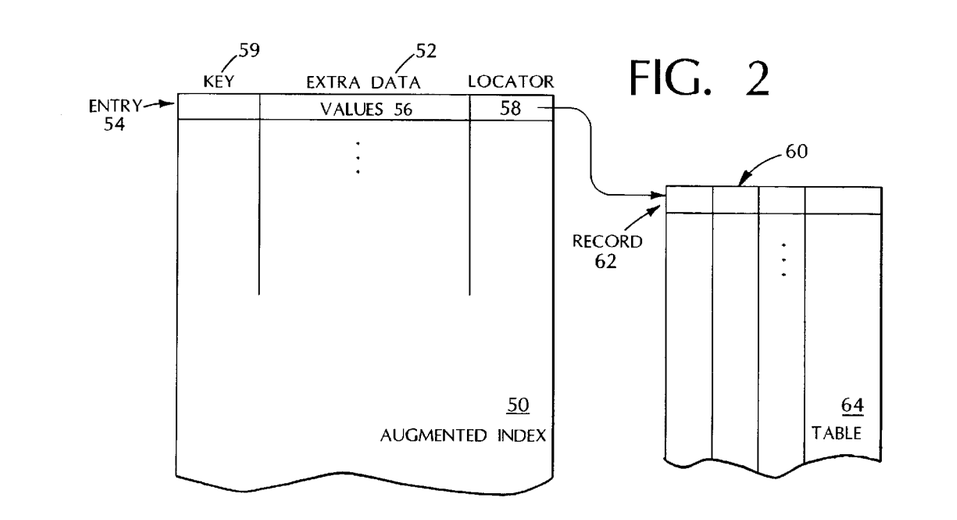

An index can be modified to reduce the computational resources needed to use and maintain it, by augmenting the index with additional information in the index entries. As seen in FIG. 2, in the resulting "augmented index" 50 we call the additional information "extra data" 52. Typically the extra data 52 in an index entry 54 consists of values 56 from one or more fields 60 from the data record 62 (in a table 64) to which the locator 58 points. In some sense this makes the entry resemble a composite index. However, in the augmented index 50 the extra data is distinct from the key 59. The database has been instructed to know which part of the index entries is the augmented index and which part is the extra data.

Figure 3:
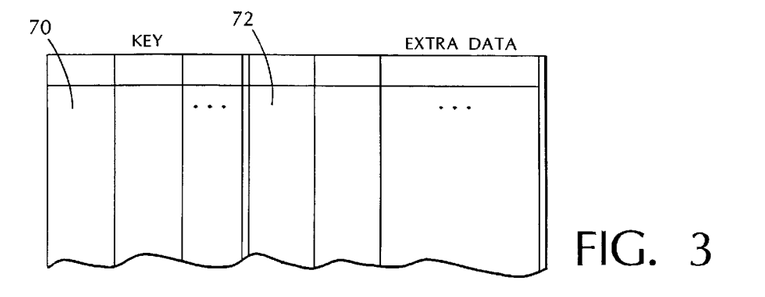

Because of the conceptual distinction between the key and the extra data, it is possible to create a particularly useful kind of augmented index called a "unique augmented index" in which the uniqueness constraint is enforced on the key 59, but not on the extra data 52. The unique augmented index can provide the functionality and performance of two (or more) conventional indexes. As seen in FIG. 3, the key or the extra data may each have more than one field 70 or 72.

A conventional index is either unique or not in its entirety. If the index is a unique index, all the fields in the key are part of the unique key and the uniqueness constraint is enforced with respect to the entire unique key.

Figure 4:
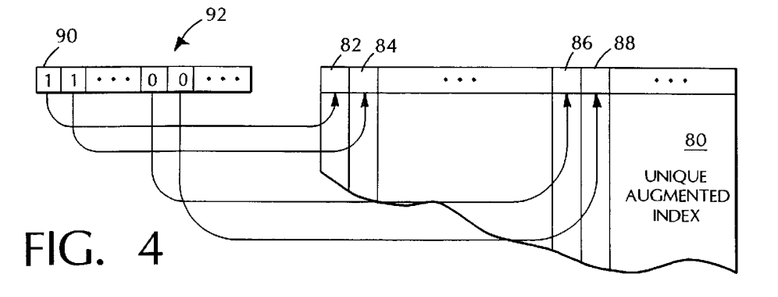

By contrast, as suggested in FIG. 4, a unique augmented index 80 may be viewed as a set of fields 82, 84, 86, 88, in which the uniqueness constraint is based on a subset of the fields 82, 84, and is not based on others of the fields 86, 88. The fields on which the uniqueness constraint is based are the key fields. If the index of FIG. 4 were a composite index, all of the fields would be associated with the uniqueness constraint and all would comprise the key.

To enforce the uniqueness, the unique augmented index 80 could include as few as one bit 90 of control data for each field 82 ... 88 to indicate whether that field is part of the uniqueness constraint. All of the bits 90 may be held in a data structure 92. In the example of FIG. 4, one-valued bits indicate fields that are included in the uniqueness constraint (i.e., are part of the key) and zero-valued bits indicate fields that are not included in the uniqueness constraint (i.e., are extra data). The algorithms used for inserting new entries into or deleting entries from index 80 enforce the uniqueness constraint with respect to the fields flagged with one-bits and ignore the fields flagged with zero-bits. By contrast, a conventional index includes (in essence) a single bit that indicates whether the index as a whole is unique.

In the example of FIG. 4, the data structure 92 contains one bit for each field and is therefore general enough to control an index in which the key and extra data fields appear in any order. In indexes in which the order of fields is constrained so that key fields all appear adjacent to each other, e.g., first, and extra data fields all appear elsewhere, the data structure could simply record the number of key fields. Using a single 8-bit byte, for example, would support up to 255 fields in the key.

A unique augmented index uses essentially the same amount of computer resources as the corresponding unique conventional composite index. But because the augmented unique index permits both index-only access and enforcement of the uniqueness constraint, it permits the physical database design to have only one index, whereas using conventional indexes would have required two. The elimination of one or more conventional indexes yields the benefits described above.

A possible syntax of a statement that could be provided in SQL to enable a user to create an augmented index would be:

CREATE [UNIQUE] INDEX I ON T (K1 [,K2 ... ])AND (E3 [,E4 ... ])

Square brackets mean that the syntactic construct is optional, and ellipses mean that the item may be repeated.

For example, The key (K) and/or the extra data (E) may have one or more fields. If the keyword UNIQUE appears, as in the case of a unique augmented index, the uniqueness constraint is enforced but only on the key portion, K1, K2 .... We now consider a specific example that illustrates differences between conventional and augmented indexes.

Figure 5:
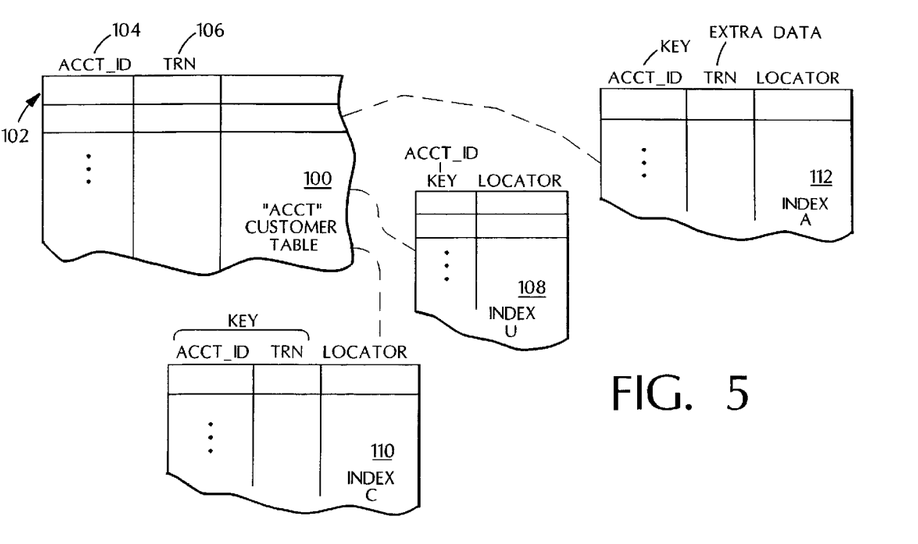

Referring to FIG. 5, in a table 100 of records 102 containing data about customers, each customer is identified by an account number in a field named ACCT_ID 104, which is the "primary key". Each account record also stores a tax reporting number in a field named TRN 106. Suppose that a frequent query is "Given a value for ACCT_ID, return the associated TRN".

If only conventional indexes are available, the database designer would define a unique index 108 (called U for "unique") needed to enforce integrity, using a standard SQL statement:

CREATE UNIQUE INDEX U ON ACCT (ACCT_ID)

If the benefit of index-only access to TRN is worth the cost in computer resources, the designer could also define a composite index 110 (called C for "composite"), using a standard SQL statement:

CREATE UNIQUE INDEX C ON ACCT (ACCT_ID, TRN)

These two conventional indexes could be replaced by a single unique augmented index 112 (called A for "augmented") that would be created using a new type of SQL statement:

CREATE UNIQUE INDEX A ON ACCT (ACCT_ID) AND (TRN)

This statement would indicate to the database system that only the key field ACCT_ID should be checked for uniqueness. Because ACCT_ID alone is a unique key, the value for field TRN can be treated as extra data and is not needed to enforce uniqueness. The syntax of the new type of SQL statement would take advantage of the already existing reserved word AND. Other syntaxes that the same semantics could be substituted.

Augmented index A could be implemented using any data structure suitable for the corresponding conventional composite index C and would occupy essentially the same amount of space. It would also require slightly less computer resources to maintain than index C.

Index A would be larger than index U because of the addition of the TRN data (and its overhead). But the computer resources required to maintain index A should be nearly the same as for index U though slightly higher because of the need to maintain the extra data. Yet the cost of an extra field, or even a few, is generally small relative to the maintenance cost of the insert, update, or delete of an index entry.

Because index C was defined as UNIQUE, the database system will enforce the uniqueness constraint when index entries are inserted or updated. This enforcement of uniqueness for index C is not necessary given the existence of index U. The index entries in index C will certainly be unique, because they contain the ACCT_ID field, whose uniqueness is already being enforced with respect to the U index.

To prevent the database system from doing needless extra work in maintaining both indexes C and U, the database designer might be tempted to create a non-unique index C2 using the statement:

CREATE INDEX C2 ON ACCT (ACCT_ID, TRN)

Index C2 would use the same amount of space as index C. But its maintenance costs will be slightly lower, as there will be no requirement to enforce uniqueness. However the designer would have lost the benefits of defining an index C2 as UNIQUE, for example, the benefit that the query optimizer would have more knowledge about the index's properties, which may lead it to choose a better execution plan.

Thus, if only conventional indexes are available, the database designer must either (redundantly) define index C as UNIQUE, and pay a slight penalty in maintenance costs, or else not define it as UNIQUE, and risk getting a worse execution plan. The unique augmented index resolves this tradeoff by providing low maintenance costs, small required space, and a high level of information for the optimizer. If only conventional indexes are available, the physical database design uses either U and C, or U and C2, either of which uses more space and more maintenance time than for a single unique augmented index A.

An augmented index on key K and extra data E corresponds to a conventional index with key K+E. The exact meaning of + depends on the implementation of the index. In the usual case of a B-tree the order of fields in the key matters, and so + must be a kind of concatenation. In a hash table based index the order of fields does not matter and so + can be implemented as a kind of union.

Operations on an augmented index are performed in a manner similar to the way they are performed on a composite index. Four basic operations on indexes are insert, delete, update, and read. An intended index entry is always found on the basis of the values of key K and extra data E in the corresponding data record in the table to which the index applies. We consider each of the operations in turn.

Figure 6:
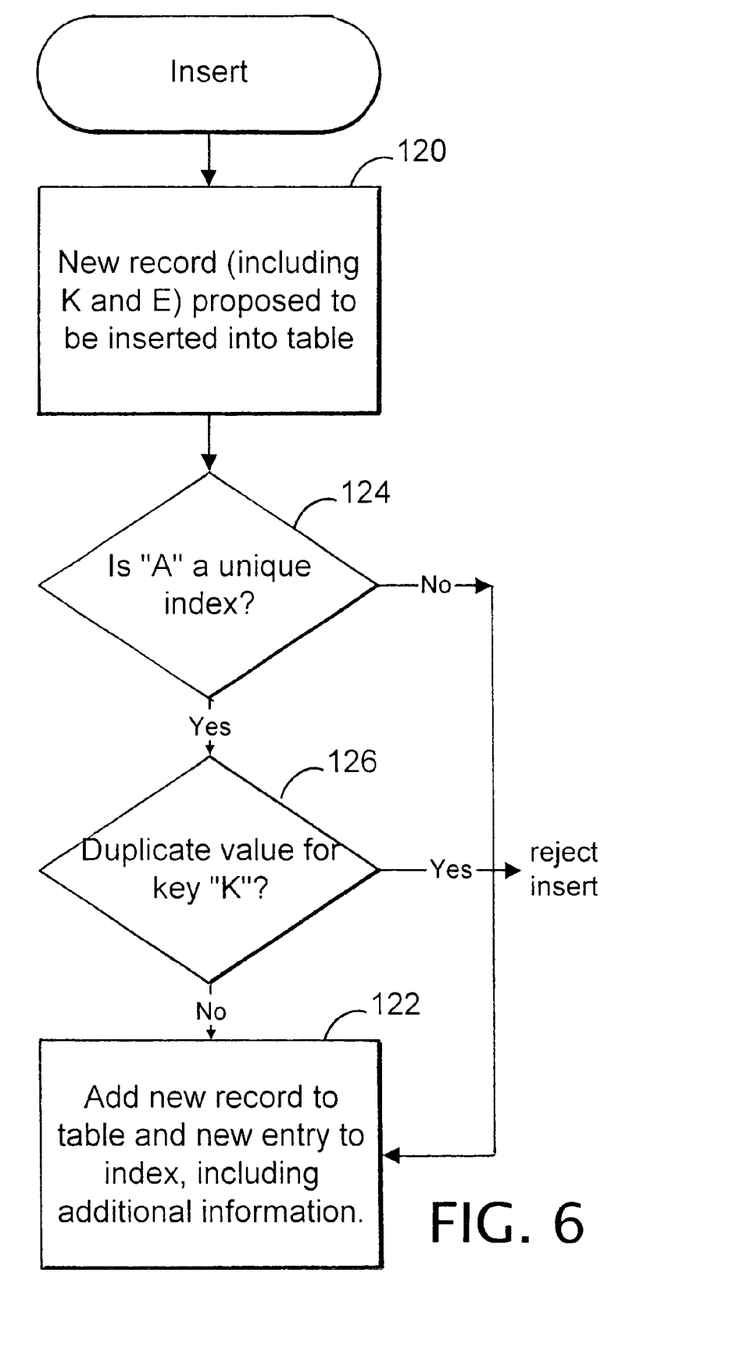
FIGS. 6 and 7 are flowcharts.

Insert—As shown in FIG. 6, when a new record (including K and E fields) is proposed to be inserted in the table (120), if A is a UNIQUE index (124) and an entry with a duplicate value for key K already exists in the index (126), then the insert is rejected. If A is not a unique index, or if there is no duplicate value for key "K", then the new record is added to the table and the index entry is added to the index 122, including the key value K and any additional information E. When testing for uniqueness, E is ignored, in contrast to a conventional unique index in which uniqueness of E would also be checked.

Delete—When a record in the table is deleted, its index entry is removed.

Figure 7:
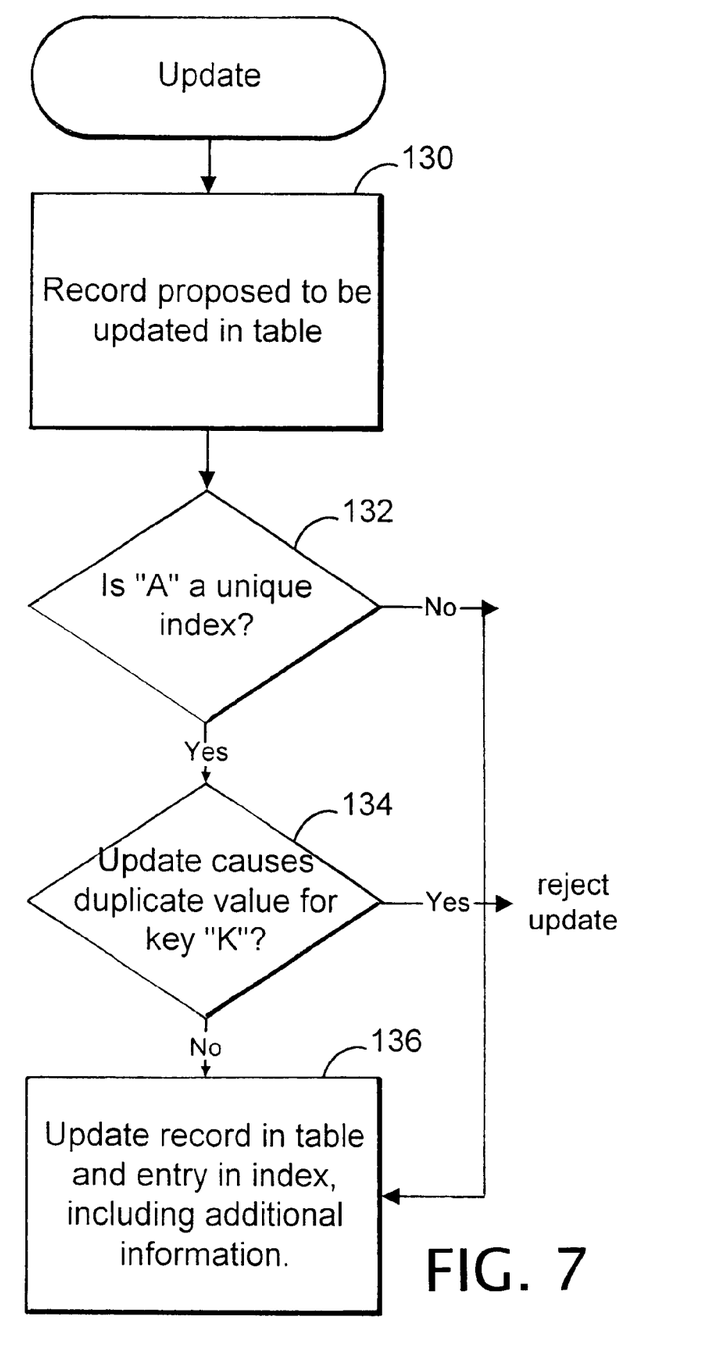

Update—Referring to FIG. 7, when a is proposed to be updated record (including possible changes in K and E fields) in the table (130), if A is a UNIQUE index (132) and an entry with a duplicate value for key K already exists in the index (134), then the update is rejected. If A is not a unique index, or if there is no duplicate value for key "K", then the record is updated in the table and the index entry is updated in the index 136, including changes in the key value K and any additional information E. When testing for uniqueness, E is ignored, in contrast to a conventional index in which uniqueness of E would also be checked. As with conventional indexes, the database system is free to optimize the change in the index entry to reflect only what changed in the data record. For example, if E has two fields E1 and E2 and only E2 changes, not E1 or K, the entry must be updated, but only E2 must be changed.

Read—When queried, the index can return any of the data in K, E, or in the data record referred to by the index entry's locator.

An augmented unique index performs better than the corresponding conventional index for index-only access. For example, a query SELECT E FROM T WHERE K='k' may be performed with respect to a table that has a record (there will be at most one) with key value 'k'. For a conventional composite index on K and E, whether unique or not, the database system will first read the index entry for 'k', and then must read another index entry for E, because it does not know that there cannot be another entry with K='k'. By contrast, using a unique augmented index, the database will only read one index entry, because it knows that K alone is a unique key. This reduction from two index entry reads to one is a significant improvement in performance.

Given an existing implementation of a conventional composite index, the size and time cost of an augmented index may be estimated. The size of index A is essentially the same as either C or C2 above (assuming that only a small number of bits are used in the index's control data structure). The time to maintain the unique augmented index cannot be greater than the time needed to maintain the unique conventional composite index C, because there are fewer fields to check for uniqueness, i.e., fewer bytes to compare. The time to maintain the index A will be no less than for a conventional index without the uniqueness constraint, e.g., C2 above.

The cost and time for index A may also be compared to index U which is defined only on K. Index A will be larger than index U based on the average size of the extra data in each entry (plus any overhead in the index entry control bits). Its maintenance time will be slightly greater because of the extra data.

An index is useful if it may improve performance on a query. (We say "may" because query optimizers can make decisions that in hindsight are not optimal, e.g., because of skew in the data, or old statistics.) If the index is useful for an access, it may be used. (We say "may" because this depends on the execution plan adopted, e.g., there may be another index that is even more useful). The database system determines if the index is useful based on data provided in the query statement and on the implementation details of the index. For a typical tree structured composite index, the order of fields matters. In this case, an index is useful if the leading edge of the key (i.e., the first one or more fields in the key) was provided. For example, an index on K and E may be useful if only K (or a leading edge of K) is provided. For other indexes, e.g., hash table based indexes, all of the key must be provided.

Although augmented indexes yield benefits, using them in all cases and for many fields may not be desirable. Storing the extra data takes up space in the index entry. Consequently, fewer index entries may be stored in a block, the overall fanout of the index is reduced, and the height of the index tends to increase.

Whether to use an augmented index depends on some of the same factors as whether to use a corresponding conventional composite index. Factors that favor defining an augmented index A on table T with key K and extra data E include (a) queries to retrieve E given a value for K are frequent (the query need only provide a useful subset of K); (b) changes to table T that affect index entries in A are infrequent; and (c) the ratio of the size of K to the size of E is large.

The invention can be implemented in software and/or hardware using conventional database systems modified to include the appropriate statement types to permit creation of augmented indexes, including unique augmented indexes, and the appropriate routines for executing searches and maintenance in a way that enforces uniqueness in the key fields of the augmented index and disregards uniqueness for the extra data.

Other embodiments are within the scope of the following claims.

For example, the invention can be used with indexes that are applied not only to relational databases but also to any other system that applies indexes to information. The other system may include a storage and retrieval system, a file system, or another kind of database system (hierarchical, network, inverted file, multi-dimensional, hybrid, object-oriented).

Other data structures that can be used to organize the data include B-trees (and variants such as B+-trees and B*-trees), hash tables, distributed schemes such as RP* and LH* data structures, multi-dimensional trees including grid files, R-trees, holey brick trees, and other kinds of trees.

The invention can be applied to any index that stores extra data record information beyond what is needed to achieve a unique key. The extra data may consist of, or can be derived from, data in the data record. The extra data need not be stored as a separate item in the index record. The extra data could, for example, be combined into the locator.

The invention is not limited to unique augmented indexes but also applies to other indexes that provide for a distinction between data used as a key and extra data. The key part of an augmented index entry may be stored uncompressed, to improve search speed, while the extra data portion may be stored compressed. The extra data need not be limited to a single kind but could include two or more types of data so that the index record is, for example, of the form "key, extra data 1, extra 2, . . . ".

There may be more than one different kind of extra data using, for example, the following syntax:
CREATE INDEX I ON T 0 AND (C1, C2) AND (C3, C4)
The zero indicates that there are no fields in the key.

The invention may apply to indexes in which the user has not explicitly requested the storage of the extra data.

For example, if the database system is adaptive to the historical mixture of queries and updates, it could decide to create an augmented index without user intervention. A system may also determine that an explicitly created augmented index is redundant with another and may avoid the redundancy. In other systems, the augmented index may be created as a combination of information from the user and the system.

The invention is not limited in terms of the kinds of access that may be accomplished using the augmented index. An online transaction processing (OLTP) could access the augmented index using its key. Alternatively, the augmented index could be scanned for particular values in the key, in the locator, or in the extra data as is done with conventional indexes in Decision Support Systems (DSS) applications.

Two indexes could be combined into one unique augmented index. If an account record contained a current balance in addition to an account identifying number and an account name, a single unique augmented index with the key based on the account identifying number could have both the account name and the current balance as additional data.

The additional data need not be drawn from the table record to which the locator points. If an account record in one table and an address record in a second table share an account identifying number and the address record also contains a ZIP field, the value of the ZIP may be stored in the index record that is keyed on the account identifying number of the account table. This could be seen as a kind of pre-computed join.

Storing extra data from another table is useful when the index is one that already maintains a referential integrity (RI) constraint with another table, because the referred to table will need to be accessed anyway to check the RI constraint. A useful variation applies when a referred-to table uses an augmented index to maintain its own unique index. In this case, the RI constraint in the first index can get the foreign data from the other index yielding another form of index-only access. In the previous example, suppose (a) there is an RI constraint that each ACCT_ID in the account table must match an ACCT_ID in the address table; (b) the address table has a unique index on the ACCT_ID; (c) the value of ZIP is stored as extra data in that unique index; and (d) the augmented index on the account table uses the ACCT_ID as its key and stores the ZIP as extra data. Then, for an any account that is inserted or updated, its account ACCT_ID and its address ID are known. The address identification number is used to enforce RI, and assuming one matching record is found, the value of ZIP is returned from the address index and stored in the account index. (If the value of ZIP in an address record can change, the extra data ZIP will need to be updated in both indexes. This could be done using conventional indexes, e.g. an index on the address identification number for the account table. But it can also be done by storing the value of the ACCT_ID as extra data in the address index. Here we see that extra data can actually be a set of values, not necessarily a single value.)

What is claimed is:

1. A method for use in retrieving information from computer-stored records, comprising providing an index of entries that contain values that are keys for respective stored records, the keys being useful to reduce the time required to locate records, including in the index of entries, additional information that is useful for a purpose other than to reduce the time required to locate records, at least some of the entries including additional information that is less than all information included in the stored records for which the entries are keys, and in connection with computer operations associated with the index, treating at least some of the keys as unique and at least some of the additional information as non-unique.

2. The method of claim 1 in which the index comprises an index to a single table of a database.

3. The method of claim 2 in which the index comprises a unique index to the table.

4. The method of claim 1 in which the index comprise a join index to at least two tables of a database.

5. The method of claim 4 in which the join index comprises a unique index to the tables.

6. The method of claim 1 in which the index comprises a unique index to at least one table of a database.

7. The method of claim 1 in which the index comprises a non-unique index to at least one table of a database.

8. The method of claim 1 in which the keys are used for locating records or checking uniqueness.

9. The method of claim 1 in which the additional information is used as data.

10. The method of claim 1 in which the additional information is derived from the records.

11. The method of claim 1 in which the additional information is derived from other stored records.

12. The method of claim 1 in which the computer-stored records comprise a database.

13. The method of claim 1 in which there is one or more than one kind of additional information.

14. The method of claim 1 in which there is additional information and no keys.

15. The method of claim 1 in which the additional information is stored in the index in a compressed form.

16. The method of claim 1 in which the additional information is of at least two different types.

17. A method of forming an index for use in connection with retrieving information from computer-stored records, comprising including entries in the index, the entries containing values that are keys for respective ones of the stored records, at least some of the entries also containing additional information, at least some of the entries including additional information that is less than all information included in the stored records for which the entries are keys, and storing data identifying the additional information as information that need not be treated as unique during computer operations associated with the index.

18. The method of claim 17 in which the stored data comprises a bit map pointing to fields that contain additional information.

19. The method of claim 17 in which the stored data comprises a value that indicates a number of fields that contain additional information.

20. The method of claim 17 in which the index comprises an index to a single table of a database.

21. The method of claim 17 in which the index comprises a unique index to the table.

22. The method of claim 17 in which the index comprise a join index to at least two tables of a database.

23. The method of claim 17 in which the join index comprises a unique index to the tables.

24. The method of claim 17 in which the index comprises a unique index to at least one table of a database.

25. The method of claim 17 in which the index comprises a non-unique index to at least one table of a database.

26. The method of claim 17 in which the keys are used for locating records or checking uniqueness.

27. The method of claim 17 in which the additional information is used as data.

28. The method of claim 17 in which the additional information is derived from the records.

29. The method of claim 17 in which the additional information is derived from other stored records.

30. The method of claim 17 in which the computer-stored records comprise a database.

31. The method of claim 17 in which there is more than one kind of additional information and no information in the keys.

32. The method of claim 17 in which the additional information is stored in the index in a compressed form.

33. The method of claim 17 in which the additional information is of at least two different types.

34. A method for use in retrieving information from computer-stored records, comprising providing a composite unique index of entries that contain values that are keys for respective ones of the stored records, the keys being useful to reduce the time required to locate records, the key fields including a proper subset of key fields that are a smaller unique index of the entries, and in connection with computer operations associated with the index, treating the key fields that are not part of the proper subset as non-unique, at least some of the non-unique key fields including information that is less than all information included in the stored records for which the entries are keys.

* * * * *

UNITED STATES PATENT AND TRADEMARK OFFICE
CERTIFICATE OF CORRECTION

PATENT NO.   : 6,466,942 B1
DATED        : October 15, 2002
INVENTOR(S)  : Steven Tolkin It is certified that error appears in the above-identified patent and that said Letters Patent is hereby corrected as shown below:

Title page,
Item [56], OTHER PUBLICATIONS, "DB2 Universal Database..." publication,
replace "www-4.com/cgi—bin/db2www" with
-- www-4.ibm.com/cgi—bin/db2www --.

Column 2,
Line 36, replace "respective the" with -- the respective --.

Column 4,
Line 48, replace "The" with -- the --.

Column 8,
Line 58, delete "an".

Column 9,
Line 24, replace "comprise" with -- comprises --.

Column 10,
Line 17, replace "comprise" with -- comprises --.

Signed and Sealed this

Twenty-fourth Day of June, 2003

JAMES E. ROGAN
*Director of the United States Patent and Trademark Office*